United States Patent
Yu et al.

(10) Patent No.: US 10,397,545 B2
(45) Date of Patent: Aug. 27, 2019

(54) 3-D LIGHT FIELD CAMERA AND PHOTOGRAPHY METHOD

(71) Applicants: Jingyi Yu, Newark, DE (US); Xinqing Guo, Newark, DE (US); Zhan Yu, Campbell, CA (US)

(72) Inventors: Jingyi Yu, Newark, DE (US); Xinqing Guo, Newark, DE (US); Zhan Yu, Campbell, CA (US)

(73) Assignee: University of Deleware, Newark, DE (US)

(*) Notice: Subject to any disclaimer, the term of this patent is extended or adjusted under 35 U.S.C. 154(b) by 238 days.

(21) Appl. No.: 15/107,661

(22) PCT Filed: Dec. 23, 2014

(86) PCT No.: PCT/US2014/072099
§ 371 (c)(1),
(2) Date: Jun. 23, 2016

(87) PCT Pub. No.: WO2015/100301
PCT Pub. Date: Jul. 2, 2015

(65) Prior Publication Data
US 2016/0330432 A1   Nov. 10, 2016

Related U.S. Application Data

(60) Provisional application No. 61/920,074, filed on Dec. 23, 2013, provisional application No. 61/931,051, filed on Jan. 24, 2014.

(51) Int. Cl.
*H04N 5/225* (2006.01)
*H04N 13/207* (2018.01)
(Continued)

(52) U.S. Cl.
CPC ........... *H04N 13/207* (2018.05); *G02B 3/005* (2013.01); *G06T 15/205* (2013.01);
(Continued)

(58) Field of Classification Search
None
See application file for complete search history.

(56) References Cited

U.S. PATENT DOCUMENTS 8,106,994 B2   1/2012   Ichimura
8,681,249 B2   3/2014   Kobayashi et al.
(Continued)

FOREIGN PATENT DOCUMENTS

CN   101500085 A   8/2009
CN   103019021 A   4/2013
(Continued)

OTHER PUBLICATIONS

Machine translation of WO-2011029440-A1 (Hahn, Mar. 2011) (Year: 2011).*
(Continued)

*Primary Examiner* — Twyler L Haskins
*Assistant Examiner* — Dwight Alex C Tejano
(74) *Attorney, Agent, or Firm* — RatnerPrestia

(57) ABSTRACT

Methods and systems for generating three-dimensional (3D) images, 3D light field (LF) cameras and 3D photographs are provided. Light representing a scene is directed through a lens module coupled to an imaging sensor. The lens module includes: a surface having a slit-shaped aperture and a cylindrical lens array positioned along an optical axis of the imaging sensor. A longitudinal direction of the slit-shaped aperture is arranged orthogonal to a cylindrical axis of the cylindrical lens array. The light directed through the lens module is captured by the imaging sensor to form a 3D LF image. A 3D photograph includes a 3D LF printed image of
(Continued)

the scene and a cylindrical lens array disposed on the printed image, such that the combination of 3D LF printed image and the cylindrical lens array forms a 3D stereoscopic image.

19 Claims, 7 Drawing Sheets

(51) Int. Cl.

| | | |
|---|---|---|
| H04N 13/111 | (2018.01) | |
| H04N 13/128 | (2018.01) | |
| H04N 13/305 | (2018.01) | |
| G06T 15/20 | (2011.01) | |
| G02B 3/00 | (2006.01) | |
| H04N 13/232 | (2018.01) | |

(52) U.S. Cl.
CPC ......... *H04N 5/2254* (2013.01); *H04N 13/111* (2018.05); *H04N 13/128* (2018.05); *H04N 13/232* (2018.05); *H04N 13/305* (2018.05); *G06T 2200/04* (2013.01); *G06T 2200/28* (2013.01); *G06T 2207/10012* (2013.01)

(56) References Cited

U.S. PATENT DOCUMENTS

| | | | | |
|---|---|---|---|---|
| 2003/0052836 A1* | 3/2003 | Matsumoto | ........ | G02B 27/2214 345/6 |
| 2005/0219693 A1* | 10/2005 | Hartkop | ................. | H04N 13/31 359/462 |
| 2007/0230944 A1* | 10/2007 | Georgiev | ............. | H04N 5/2254 396/322 |
| 2009/0185801 A1* | 7/2009 | Georgiev | ............... | G03B 15/00 396/332 |
| 2009/0190022 A1* | 7/2009 | Ichimura | .............. | G02B 3/0056 348/340 |
| 2009/0295829 A1 | 12/2009 | Georgiev et al. | | |
| 2010/0003024 A1* | 1/2010 | Agrawal | .............. | H04N 5/2254 396/340 |
| 2011/0174998 A1* | 7/2011 | Molnar | ................... | G01S 3/782 250/550 |
| 2011/0261464 A1* | 10/2011 | Hoffman | ................ | G02B 3/005 359/619 |
| 2011/0273609 A1* | 11/2011 | DiFrancesco | .......... | G02B 13/16 348/345 |
| 2012/0229683 A1 | 9/2012 | Kobayashi et al. | | |
| 2013/0222606 A1 | 8/2013 | Pitts | | |

FOREIGN PATENT DOCUMENTS

| | | | | |
|---|---|---|---|---|
| JP | 2004239932 A | 8/2004 | | |
| JP | 2008294741 A | 12/2008 | | |
| JP | 2009290268 A | 12/2009 | | |
| JP | 2012186764 A | 9/2012 | | |
| JP | 2013105151 A | 5/2013 | | |
| WO | 2011029440 | 3/2011 | | |
| WO | WO-2011029440 A1 * | 3/2011 | ......... | G02B 27/2221 |
| WO | 2013038628 | 3/2013 | | |
| WO | 2013068882 | 5/2013 | | |

OTHER PUBLICATIONS

Supplementary European Search Report for Application No. 14874923.7, dated Jun. 30, 2017, 7 pages.
International Search Report dated Mar. 18, 2015 for International Application No. PCT/US2014/072099, 2 pages.
International Preliminary Report on Patentability and Written Opinion of the International Searching Authority dated Jun. 28, 2016 for International Application No. PCT/US2014/072099, 6 pages.
Notice of Reasons for Rejection for Japanese Application No. 2016-543029, dated Dec. 4, 2018, with translation, 6 pages.
Chinese Office Action for Chinese Application No. 201480073939.9, dated Jul. 19, 2018, with translation, 24 pages.
Chinese Office Action with Search Report for Chinese Application No. 201480073939.9, dated Mar. 21, 2019, 29 pages.

* cited by examiner

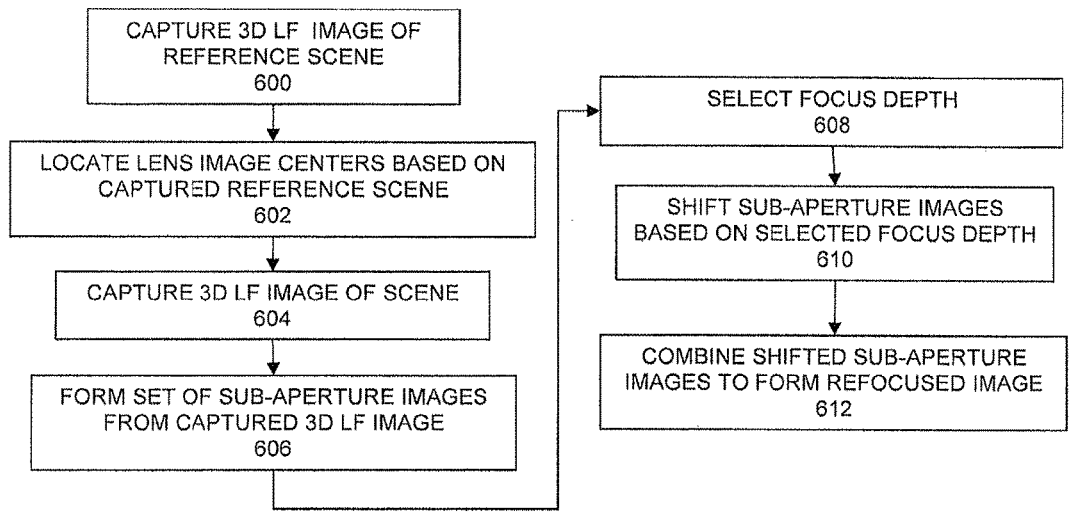
FIG. 6A
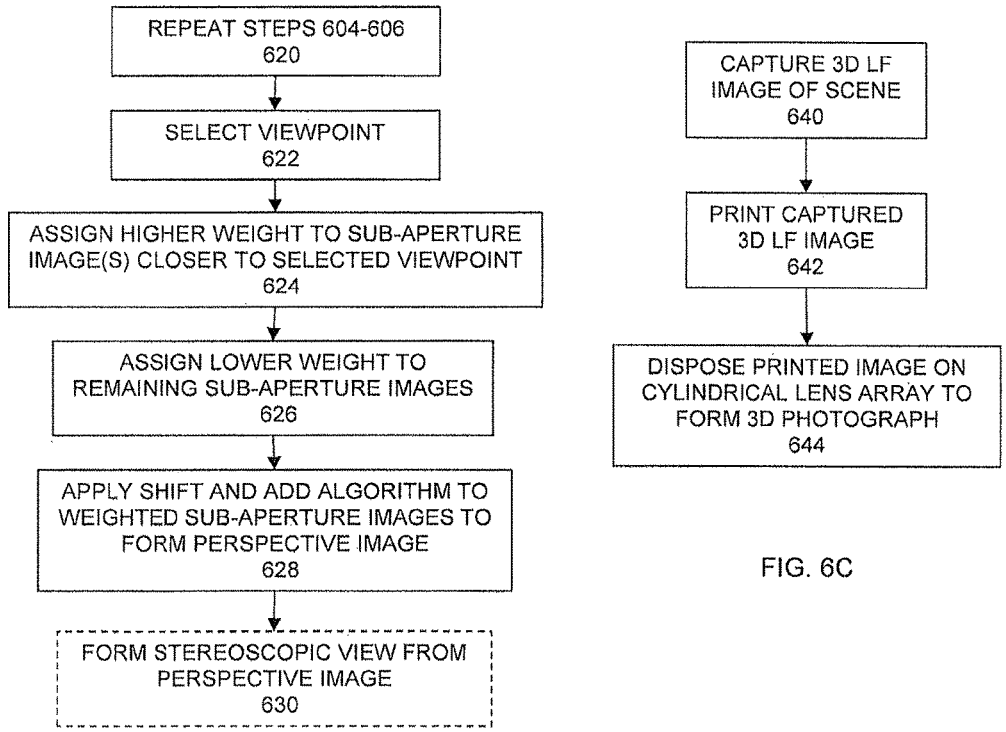
FIG. 6B
FIG. 6C

3-D LIGHT FIELD CAMERA AND PHOTOGRAPHY METHOD

CROSS REFERENCE TO RELATED APPLICATIONS

This application is a U.S. National Phase application of PCT Application No. US2014/072099, filed Dec. 23, 2014 and published on Jul. 2, 2015, as WO/2015/100301, which claims priority to U.S. Provisional Application No. 61/920,074 entitled 3-D LIGHT FIELD CAMERA AND PHOTOGRAPHY METHOD, filed on Dec. 23, 2013, and U.S. Provisional Application No. 61/931,051 entitled 3-D LIGHT FIELD CAMERA AND PHOTOGRAPHY METHOD, filed on Jan. 24, 2014, the contents of which are incorporated herein by reference.

STATEMENT REGARDING FEDERALLY SPONSORED RESEARCH

The present invention was supported in part by Grant Number 0845268 from the National Science Foundation. The United States Government may have certain rights to the invention.

FIELD OF THE INVENTION

The present invention is related to three-dimensional (3D) imaging, and in particular to 3D light-field cameras, methods and systems for capturing and presenting 3D images.

BACKGROUND

There is an emerging interest in developing a light-field (LF) camera, also called a plenoptic camera. An LF camera uses a microlens array to capture four-dimensional (4D) light field information about the scene. Such light field information may be used to improve the resolution of computer graphics and computer vision applications.

SUMMARY OF THE INVENTION

Aspects of the present invention relate to a method of generating an image of a scene. Light representing the scene is directed through a lens module coupled to an imaging sensor. The lens module includes a surface having a slit-shaped aperture and a cylindrical lens array positioned along an optical axis of the imaging sensor. A longitudinal direction of the slit-shaped aperture is arranged orthogonal to a cylindrical axis of the cylindrical lens array. Light directed through the lens module is captured by the imaging sensor to form a 3D LF image.

Aspects of the present invention also relate to a 3D LF camera. The 3D LF camera includes a surface having a slit-shaped aperture mounted on a lens, an imaging sensor and a cylindrical lens array disposed between the imaging sensor and the lens. The cylindrical lens array is arranged along an optical axis of the imaging sensor. A longitudinal direction of the slit-shaped aperture is arranged orthogonal to a cylindrical axis of the cylindrical lens array. The imaging sensor is configured to capture at least one 3D LF image of a scene.

Aspects of the present invention also relate to a 3D photograph. The 3D photograph includes a 3D light field printed image of a scene and a cylindrical lens array disposed on the 3D light field printed image. The combination of the 3D light field printed image and the cylindrical lens array forms a 3D stereoscopic image.

BRIEF DESCRIPTION OF THE DRAWINGS

The invention may be understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover, in the drawings, common numerical references are used to represent like features/elements. The patent or application file contains at least one drawing executed in color. Copies of this patent or patent application publication with color drawings will be provided by the Office upon request and payment of the necessary fee. Included in the drawing are the following figures:

FIG. 6A is a flow chart diagram illustrating an example method for rendering a refocused image, according to an aspect of the present invention;

FIG. 6B is a flow chart diagram illustrating an example method for rendering an image, according to another aspect of the present invention;

FIG. 6C is a flow chart diagram illustrating an example method for forming a 3D photograph, according to an aspect of the present invention;

DETAILED DESCRIPTION OF THE INVENTION

Figure 1:
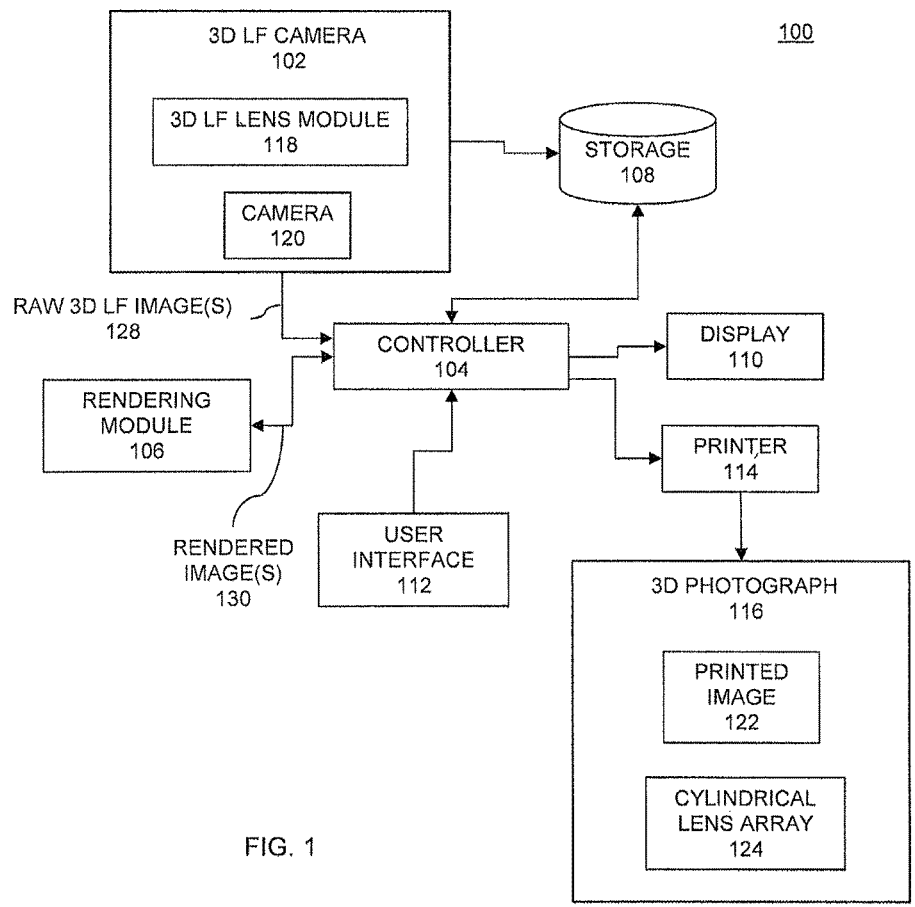
FIG. 1 is a functional block diagram of an example system for capturing and presenting 3D images, according to an aspect of the present invention.

Current light field cameras suffer from poor resolution. For example, light field cameras with a 10 megapixel sensor only produce images at a very low resolution (e.g., about 1 megapixel). The low resolution resultant image is inherent to the design of all current light field cameras: they sacrifice spatial resolution for angular resolution. The spatial resolution is defined as the sampling rate in space. In a conventional (non-light field) camera, the spatial resolution amounts to the sensor's resolution. In a light field camera, the total number of sampling points in space is equal to the number of lenses. Given that the size of the lens is usually several times larger than the pixel pitch, the spatial resolution may be reduced. However, pixels underneath each lens will record rays passing through its common sampling point with different directions. The directional specificity defines the camera's angular resolution. Under the assumption that the sensor has limited resolution, there may be a trade-off between the spatial resolution and the angular resolution, which equates to a balance between image resolution and the number of views.

Current cameras which capture a light field include 4D light field cameras which record both angular and spatial information in all directions. For example, one current 4D light field camera includes a 328×328 microlens array attached to an imaging sensor, where each microlens covers about 100 pixels. In this example, a light field of about 328×328 spatial resolution and about 10×10 angular resolution may be obtained. The inherent tradeoff made by the light field camera provides more angular resolution at the expense of lowering spatial resolution. Although the camera in this example is equipped with an 11 megapixel sensor, it only delivers images with an effective resolution of about 700×700. Other 4D light field cameras share a similar design and similar limitations.

With respect to 3D display, most existing 3D televisions uses shutter-glass technology to display stereoscopic 3D images. A disadvantage of this technique is that it produces flickering (which can be noticed except at very high refresh rates.) In addition, current 3D viewing techniques (such as by shutter glasses) are inconvenient and expensive for viewing 3D photographs.

Aspects of the present invention include a 3D light field camera that combines a camera, a cylindrical lens array attached to the imaging sensor of the camera and a modified lens with a narrow-slit aperture. In some examples, the camera may include a digital single-lens reflex (DSLR) camera. In some examples, a 3D light field camera uses a vertical cylindrical lens array. The vertical cylindrical lens array may be used to maintain the vertical resolution while only trading between the horizontal resolution and the angular resolution. To reduce defocus blurs, the cylindrical lens array may be coupled with a slit shaped aperture.

With the rapid growth of 3D display technology, people are more likely to watch 3D content instead of two dimensional (2D) images. Example 3D light field cameras of the present invention go beyond the capability of merely watching 3D content. With exemplary 3D light field cameras and exemplary systems for capturing and presenting 3D images, the 3D content may be captured directly from the scene and then displayed. By attaching a cylindrical lens array to the sensor and a narrow-slit mask to the aperture, a consumer DSLR camera may be converted to a 3D light field camera. Users can take pictures with an exemplary 3D light field camera similarly to a conventional camera.

Aspects of the present invention also relate to exemplary methods and systems for rendering 3D stereoscopic images from a raw light field image. With the captured raw light field image, 3D stereoscopic images may be rendered from different perspectives with view-dependent features such as occlusion and reflection. Because the 3D light field camera can simultaneously capture the scene from different viewpoints in a single shot, the acquired views will exhibit parallax, i.e., closer objects exhibit larger disparity across views. The capability of preserving parallax enables naked eye 3D visualization of the scene/object. The same capability enables preservation of view-dependent features such as reflections where each view (i.e., sub-image) captures a slightly different image of the scene. In some examples, the system may render a refocused image at predetermined focus depth from the raw light field image. Example methods use image based rendering (IBR) techniques. Specifically, simple geometry (such as a 3D plane) may be used as a proxy to scene geometry. All captured views can be warped onto the geometry and re-rendered (e.g., via ray-tracing or texture mapping) to the desired view. The process is analogous to specifying a focal depth in commodity SLR cameras. When all views are combined after warping, the results emulate defocus blurs in conventional wide aperture photography.

Aspects of the present invention also relate to methods and devices for 3D viewing. According to some examples, the device falls into the category of an autostereoscopic 3D display, i.e., viewing 3D without glasses.

Referring to FIG. 1, a system 100 for capturing and presenting 3D images is shown. System 100 includes 3D LF camera 102, controller 104, rendering module 106, storage 108, display 110, user interface 112, printer 114 and 3D photograph 116. Although not shown, system 100 may be coupled to a remote location, for example via a global network (i.e., the Internet).

3D LF camera 102 includes 3D LF lens module 118 and camera 120. As described further below with respect to FIGS. 2A-2C, lens module 118 includes cylindrical lens array 210 and slit shaped aperture 206. Camera 120 may include any suitable general purpose camera having a main lens (e.g., lens 208 shown in FIG. 2B) and an imaging sensor (e.g., imaging sensor 214). In some examples, camera 120 includes a DSLR camera. In one example, camera 118 includes a DSLR camera model number XSi manufactured by Canon Inc. (Tokyo, Japan). To convert camera 120 to 3D LF camera 102, mask 204 (FIG. 2B) having slit shaped aperture 206 of lens module 118 may be used to modify the aperture of main lens 208, and cylindrical lens array 210 of lens module 118 may be attached to imaging sensor 214. In some examples, lens module 118 may be detachably coupled from camera 120.

3D LF camera 102 may be configured to capture (raw) 3D LF image 128 of a scene. In some examples, 3D LF camera 102 may capture two or more 3D LF images 128 of the scene, such as over a predetermined time period. Thus, in some examples, 3D LF camera 102 may include a video camera. In general, 3D LF camera 102 may capture at least one 3D LF image 128 of the scene.

Controller 104 may be coupled to one or more of 3D LF camera 102, rendering module 106, storage 108, display 110, user interface 112 and printer 114, to control capture, storage, display, printing and/or processing of 3D LF image(s) 128. Controller 104 may include, for example, a logic circuit, a digital signal processor or a microprocessor. It is understood that one or more functions of rendering module 106 may be performed by controller 104.

Rendering module 106 may be configured to process 3D LF image(s) 128 to form rendered image(s) 130. Rendering module 106 may be configured to calibrate 3D LF camera 102 to locate a lens center of each lens 212 (FIG. 2B) in cylindrical lens array 212. Rendering module 106 may also be configured to render a refocused image (after calibration) for various refocus planes. Refocusing is described further below with respect to FIG. 6A. In some examples, rendering module 106 may be configured to apply a predetermined perspective to 3D LF image(s) 128. In some examples, rendering module 106 may be also configured to generate a stereoscopic view of 3D LF image(s) 128. Perspective and stereoscopic processing are described further below with respect to FIG. 6B. In general, rendered image(s) 130 may be processed to include at least one of refocusing to a predetermined focus depth, perspective rendering or stereoscopic viewing. It is understood that refocusing, perspective rendering and stereoscopic view rendering represent example processing by rendering module 106, and that rendering module 106 may perform additional processing of 3D LF image(s) 128 such as, without being limited to, filtering, noise reduction, etc. Rendering module 106 may include, for example, a logic circuit, a digital signal processor or a microprocessor.

Storage 108 may be configured to store at least one of raw 3D LF image(s) 128 (from 3D LF camera 102 or via controller 104) or rendered image(s) 130 (from rendering module 106). Storage 108 may also store parameters associated with controller 104 and/or rendering module 106. Although storage 108 is shown separate from 3D LF camera 102, in some examples, storage 108 may be part of 3D LF camera 102. Storage 108 may include any suitable tangible, non-transitory computer readable medium, for example, a magnetic disk, an optical disk or a hard drive.

Raw 3D LF image(s) 128 (from 3D LF camera 102) and/or rendered image(s) 130 (from rendering module 106) may be displayed on display 110. Display 110 may include any suitable display device configured to display raw 3D LF image(s) 128/rendered image(s) 130.

User interface 112 may include any suitable user interface capable of receiving user input associated with, for example, selection of rendering to be performed by rendering module 106, parameters associated with rendering module 106, storage selection in storage 108 for captured images 128/ rendered images 130, display selection for images 128, 130 and/or print selection for images 128, 130. User interface 112 may include, for example, a pointing device, a keyboard and/or a display device. Although user interface 112 and display 110 are illustrated as separate devices, it is understood that the functions of user interface 112 and display 110 may be combined into one device.

Raw 3D LF image 128 and/or rendered image 130 may be printed by printer 114, to form printed image 122. Printer 114 may include any suitable printer device configured to print raw 3D LF image 128/rendered image 130. In some examples, printer 114 may include a laser printer configured to print a color and/or a black and white printed image 122. In some examples, printed image 122 includes a glossy finish paper.

Figure 3:
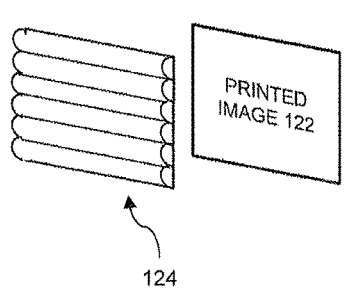
FIG. 3 is an exploded perspective view diagram of an example 3D photograph of the system shown in FIG. 1, according to an aspect of the present invention.

Referring to FIGS. 1 and 3, 3D photograph 116 is described. FIG. 3 is an exploded perspective view diagram of example 3D photograph 116. 3D photograph 116 may include cylindrical lens array 124 disposed on printed image 122 (printed by printer 114). Thus, in addition to displaying images on display 110, raw 3D LF image 128 (or rendered image 130) may be printed (via printer 114) to form printed image 122, for example, on glossy photo paper (to form printed image 120). Printed image 122 may then be mounted on cylindrical lens array 124 to produce 3D photograph 116. This is a practical 3D photography technique that may allow users to directly perceive solid 3D stereoscopic views from different perspectives, without 3D glasses. An example 3D photograph 116 may appear similar to a photo frame, but with a special photograph (printed image 122) and special cover glass (cylindrical lens array 124). The choice of cylindrical lens array 124 is independent from 3D LF image 128. For example, 3D LF image 128 may be re-sampled to fit the physical properties (e.g., lenslet width, density, focal length, etc.) of cylindrical lens array 124 to produce desirable 3D effects.

3D photograph 116 may be used to capture other objects, such as a sculpture, food, etc. For example, a restaurant may use 3D photograph 116 to generate a 3D menu or display of their food. 3D photograph 116 may be inexpensive and portable, making it suitable for product advertising.

Referring back to FIG. 1, in some examples, system 100, via 3D LF camera 102, may be used to produce a 3D portrait. In some examples, rendering module 106 of system 100 may generate rendered image(s) 130, enabling people to view the 3D portrait from different perspectives on display 110. In some examples, system 100 may print raw 3D LF image 128 and/or rendered image 130 (as printed image 122) via printer 114. In some examples, system 100 may produce 3D photograph 116 (from printed image 122 coupled with cylindrical lens array 124).

A suitable 3D LF camera 102, controller 104, rendering module 106, storage 108, display 110, user interface 112, printer 114 and 3D photograph 116 may be understood by the skilled person from the description herein.

Figure 2A:
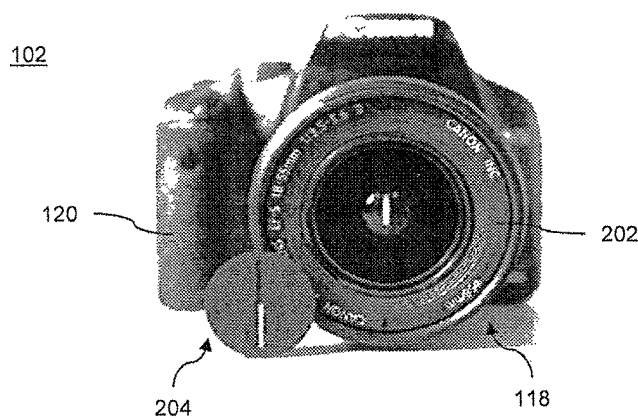
FIG. 2A is a perspective view diagram of an example 3D LF camera of the system shown in FIG. 1, according to an aspect of the present invention.
Figure 2B:
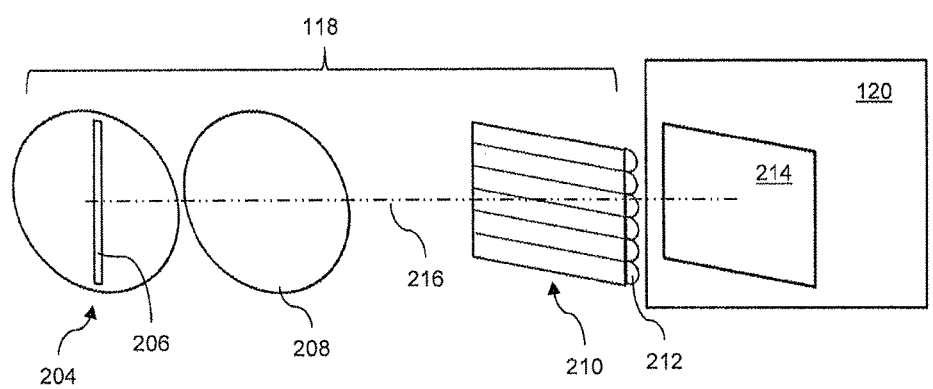
FIG. 2B is an exploded perspective view diagram of an example 3D LF camera shown in FIG. 2A, illustrating components of a 3D LF lens module and camera, according to an aspect of the present invention.
Figure 2C:
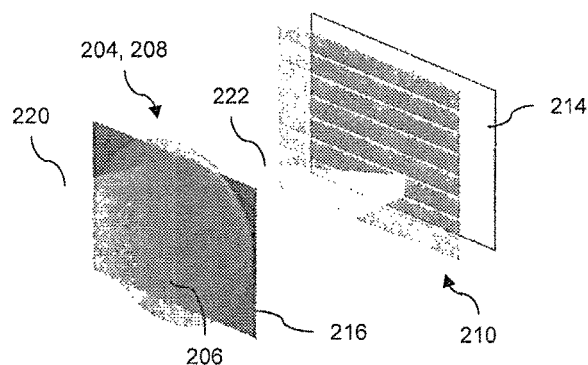
FIG. 2C is an exploded perspective view diagram of the example 3D LF camera shown in FIG. 2B, illustrating light ray geometry for a 3D LF camera, according to an aspect of the present invention.

Referring next to FIGS. 2A-2C, example 3D LF camera 102 is shown. In particular, FIG. 2A is a perspective view diagram of 3D LF camera 102 and FIGS. 2B and 2C are exploded perspective view diagrams of 3D LF camera 102. FIG. 2A illustrates 3D LF lens module 118 coupled to a body of camera 120. FIG. 2A also illustrates slit mask 204 of lens module 118. Lens module 118 may include housing 202 having slit mask 204 and cylindrical lens array 210 (FIG. 2B). FIG. 2B illustrates the arrangement of 3D LF lens module 118 and imaging sensor 214 of camera 120 relative to optical axis 216. FIG. 2C illustrates an example light ray geometry for 3d LF camera 102.

As shown in FIG. 2B, 3D LF lens module 118 may include slit mask 204 having slit-shaped aperture 206, main lens 208 and cylindrical lens array 210 disposed along optical axis 216. Cylindrical lens array 210 includes a plurality of cylindrical lenses 212. A width of each cylindrical lens 212 may be microscopic (e.g., a few hundreds of microns) compared to main lens 208. Slit mask 204 is disposed on main lens 208 and arranged such that a longitudinal direction of slit-shaped aperture 206 (i.e., a slit length) is positioned orthogonal to cylindrical axis 410 (FIG. 4A) of cylindrical lenses 212 of cylindrical lens array 210. Aperture 206 is configured to change a shape of the aperture of main lens 208 from circularly-shaped to slit-shaped. In some examples, main lens 208 includes a consumer lens of camera 120. In some examples, slit mask 204 includes a plastic sheet having slit-shaped aperture 206 formed therethrough. Cylindrical lens array 210 is disposed on imaging sensor 214.

Figure 5A:
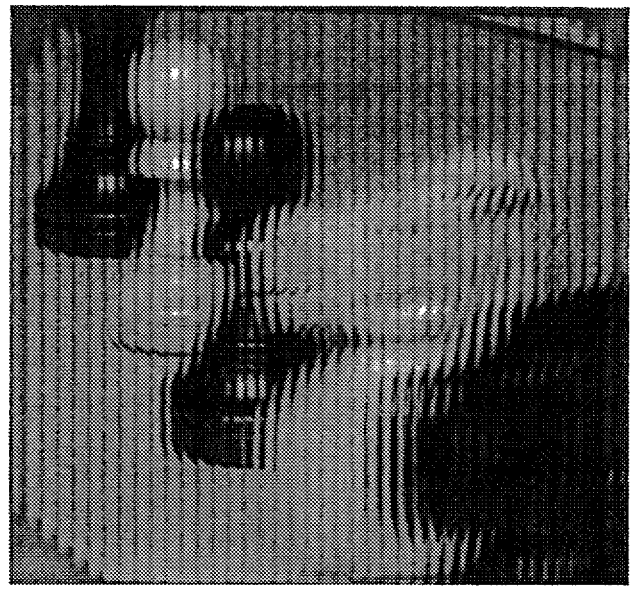
FIGS. 5A and 5B are example raw 3D light field images captured by an example 3D LF camera shown in FIG. 1, according to an aspect of the present invention.
Figure 5B:
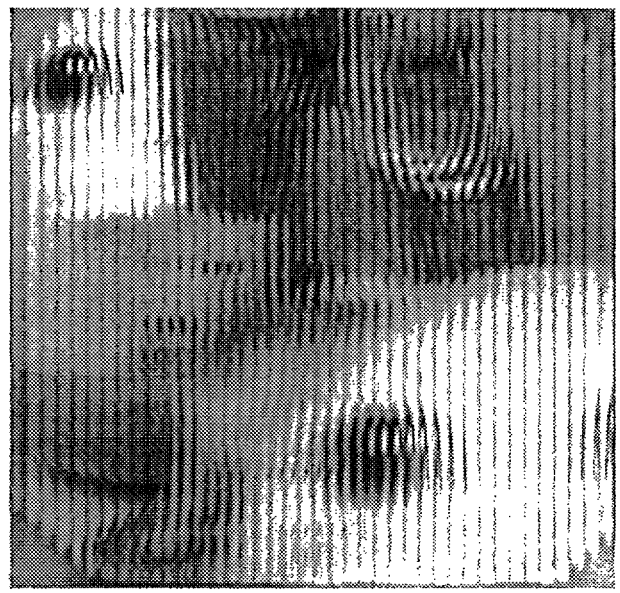

As an example, aperture 206 has width of about 1.3 mm. Cylindrical lens array 210 includes 40 lenses 212. Lens array 210 is of size 10 mm by 10 mm where each lens 212 has a pitch of about 0.25 mm and a focal length of about 1.6 mm. In general, the width of aperture 206, the number of lenses 212, the pitch of each lens 212, the focal length of each lens and the size of lens array 210 may be selected to produce a desired resolution for 3D LF lens module 118. In the example above, the selected parameters of lens module 118 produces an effective resolution of about 2000×2000. The number of rays captured by 3D LF camera 102 may also depends on the resolution of imaging sensor 214. In an example, the resolution of imaging sensor 214 is approximately 5,184×3,456. FIGS. 5A and 5B show example raw light field images captured by 3D LF camera 102 for two different scenes.

As shown in FIG. 2C, because the directions of slit aperture 206 and cylindrical lenses 212 are orthogonal to each other, a cone of rays 220 emitted by a point on object 402 (FIG. 4B) will be mostly blocked by slit mask 204, allowing only fan of rays 222 to pass through main lens 208. The passing rays 222 may be optically sorted by direction (shown by rays 412 in FIG. 4B) onto the pixels of imaging sensor 214 under cylindrical lens array 210.

Users may capture images with 3D LF camera 102 similarly as with a conventional camera (such as a DSLR camera), by attaching 3D LF lens module 118 to camera 120. Thus, by simply pressing a shutter button of camera 120, at least one 3D LF image may be captured, the same way a 2D image is typically captured. Accordingly, there may be a minimal learning curve for using 3D LF camera 102. 3D LF images 128 (FIG. 1) captured by 3D LF camera 102 may be tailored by rendering module 106, displayed (via display 110) or printed out (via printer 114) for visualization.

Figure 4A:
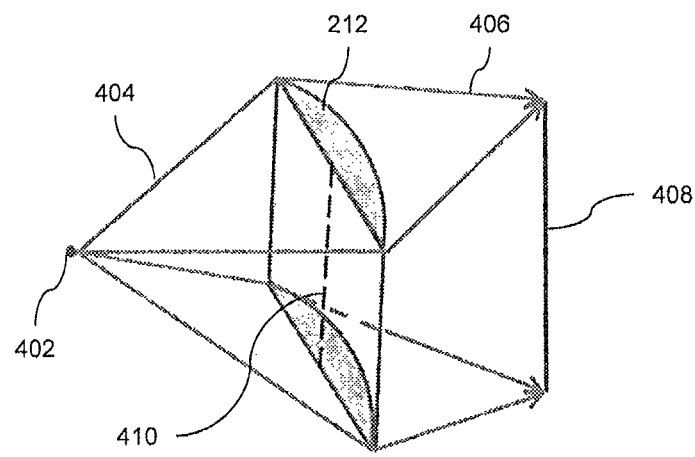
FIG. 4A is an example diagram illustrating focusing of a cone of rays by a cylindrical lens, according to an aspect of the present invention.
Figure 4B:
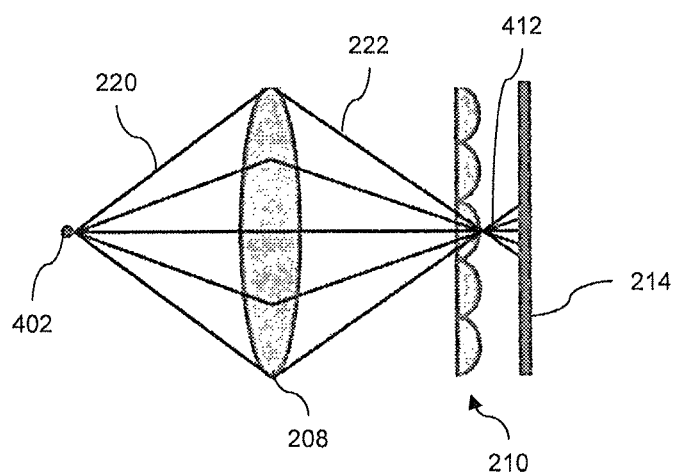
FIG. 4B is diagram illustrating optical sorting of a sheet of rays onto an imaging sensor by an example 3D LF camera shown in FIG. 1, according to an aspect of the present invention.

Referring to FIGS. 2C, 4A and 4B, the light ray geometry of light rays 202 through 3D LF camera 102 is further described. In particular, FIG. 4A is an example diagram illustrating focusing of cone of rays 404 by cylindrical lens 212; and FIG. 4B is a diagram illustrating optical sorting of sheet (i.e., fan) of rays 222 onto imaging sensor 214.

In a conventional camera, the value of each pixel is the integral of many rays across the aperture, which results in a high spatial resolution but very low angular resolution. 3D LF camera 102 is capable of diverging rays in one direction, while maintaining high spatial resolution in the other direction. Specifically, cone of rays 220 emitted from object 402 will be converged and partially blocked by slit mask 204 on main lens 108, becoming sheet of rays 222. Rays 222 may be optically sorted by direction via cylindrical lens array 212, to form sorted rays 412. Sorted rays 412 from cylindrical lens array 210 are then directed onto pixels (not shown) of imaging sensor 214.

As shown in FIG. 4A, cylindrical lens 212 is configured such that rays 406 converge in one direction, leaving the other direction unaltered. Therefore, incoming light 404 from object 402 is focused by cylindrical lens 212 into line 408.

As shown in FIGS. 2C and 4B, because cone of rays 220 becomes sheet of rays 222 after they pass through slit mask 204 and main lens 208, there is no need to converge rays in two directions, as in the case of spherical lens array. Cylindrical lens array 210 provides angular information in one direction, by converging rays in that direction, while keeping its high spatial resolution along the other direction (i.e., along the direction of cylindrical axis 410). If cylindrical lens array 210 is replaced with a microlens array, however, slit aperture 206 may result in either overlapping lens images or a waste of resolution.

Referring to FIG. 6A, an example method for rendering a refocused image from 3D LF image 128 (FIG. 1) is shown. Some of the steps illustrated in FIG. 6A may be performed by rendering module 106 (FIG. 1) from 3D LF image 128 captured by 3D LF camera 102. The steps illustrated in FIG. 6A represent an example embodiment of the present invention. It is understood that certain steps may be performed in an order different from what is shown. Although FIG. 6A illustrates rendering a single refocused image, the method shown in FIG. 6A may also be applied to a plurality of captured 3D LF images of the scene.

At step 600, a 3D LF image of a reference scene is captured, for example, via 3D LF camera 102 (FIG. 1). At step 602, a lens center of each cylindrical lens 212 of cylindrical lens array 210 is located, based on the captured image of the reference scene (step 600). The located lens centers may be stored in storage 108 (FIG. 1).

3D LF camera 102 may generate images 128 with parallax. In general the exact placement of cylindrical lens array 210 is unknown, and the baseline between cylindrical lens may be a non-integer multiple of pixel pitch. Therefore, to locate the image centers of lenses 212, an image of a white scene is captured in step 600. Because of vignetting, the brightest line along each lenslet image is taken, in step 602, to approximate the center of cylindrical lens. The lenslet image refers to the image formed by pixels lying right beneath a cylindrical lenslet 212 (FIG. 2B). Steps 600-602 may be performed to calibrate 3D LF camera 102, for example, prior to its first use in system 100. Thus, in some examples, steps 600-602 may be performed once and the results stored in storage 108 (FIG. 1). Steps 604-612 may be performed using the lens centers stored in storage 108, without performing steps 600-602 subsequent to calibration of 3D LF camera 102.

At step 604, a 3D LF image 128 is captured of a desired scene, for example, via 3D LF camera 102 (FIG. 1). The captured 3D LF image 128 may be stored in storage 108 (FIG. 1). At step 606, a set of sub-aperture images (e.g., the vertical segments of the images shown in FIGS. 5A and 5B) are formed from the captured (raw) 3D LF image (step 604), for example, by rendering module 106 (FIG. 1). The captured 3D LF image (step 604) may be reassembled into a set of sub-aperture images. First, the LF image is split (i.e., separated) into lenslet images. Then, pixels in the lenslet images are reassembled into sub-aperture images. Specifically, an identical column (e.g., column 5) of pixels may be selected in all lenslet images and then stitched together to form a sub-aperture image. Different choices of columns correspond to different sub-aperture images. If all lenslet images are captured by cylindrical lenses 212 (FIG. 2B) of identical width, they should have the same number of columns. Therefore, if each lenslet image has 8 columns, 8 different sub-aperture images may be synthesized.

At step 608, a focus depth is selected, for example, via user interface 112 (FIG. 1). At step 610, each sub-aperture image is shifted to the selected focus depth (step 608), via rendering module 106, based on the located image centers (step 602) according to a ray tracing algorithm.

Based on classical radiometry, the irradiance of a point on the film (or image plane where the film is positioned) is the integral of all the rays across the aperture reaching the point:

$$E_F(x, y) = \frac{1}{F^2} \int \int L_F(x, y, u, v)(\cos\theta)^4 du\,dv \tag{1}$$

Where F is the separation between lens 208 (FIG. 2B) and the film (i.e., imaging sensor 214), $E_F(x, y)$ is the irradiance of (x, y) position on the film, $L_F$ is the light field parameterized by lens plane uv and film plane xy, θ is the angle between ray (x, y, u, v) and the image plane normal. For simplicity, $L_F$ may be redefined as $L_F(x, y, u, v) := L_F(x, y, u, v)(\cos\theta)^4$.

Figure 7:
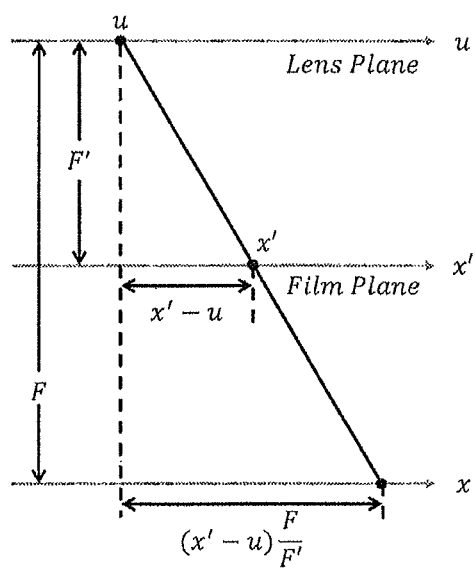
FIG. 7 is an example diagram illustrating ray re-parameterization for rendering a refocused 3D image, according to an aspect of the present invention.
Figure 8A:
FIGS. 8A, 8B, 8C and 8D are example rendered 3D images for various focus depths, according to an aspect of the present invention.
Figure 8B:
Figure 8C:
Figure 8D:

To focus at a different plane, the separation between the lens plane and the film plane is changed. For example, to focus at a new depth F', as shown in FIG. 7, the image can be rendered as described below. In FIG. 7, axes v, y', y extend out from the drawing (orthogonal to respective axes u, x', x).

Using a similar triangle, the ray (u, x'), where x' is the coordinate on film plane, can be re-parameterized as $$\left(u, (x'-u)\frac{F}{F'}\right)$$

at the original x plane. As a result, if α=F'/F is defined as the relative depth of the film plane, then $$L_{F'}(x', y', u, v) = L_F\left(u + \frac{x'-u}{\alpha}, v + \frac{y'-v}{\alpha}, u, v\right) \quad (2)$$

Therefore, the final equation for pixel value (x', y') in the film at the depth F'=α·F from the lens plane becomes:

$$E_{(\alpha \cdot F)}(x', y') = \quad (3)$$
$$\frac{1}{\alpha^2 F^2} \int\int L_F\left(u\left(1-\frac{1}{\alpha}\right)+\frac{x'}{\alpha}, v\left(1-\frac{1}{\alpha}\right)+\frac{y'}{\alpha}, u, v\right) du\, dv$$

Because each object emits sheet of rays 222 (FIG. 2C) after being filtered by slit mask 204 on main lens 208, the following approximation may be used: y=y'=v. Thus, equation (3) may be re-written as:

$$E_{(\alpha \cdot F)}(x', y') = \frac{1}{\alpha^2 F^2} \int L_F\left(u\left(1-\frac{1}{\alpha}\right)+\frac{x'}{\alpha}, y', u, v\right) du \quad (4)$$

Thus, rays may be traced through the center of each lens (located in step 602) and used to render the refocused image. Here, the term $L_F$ corresponds to the sub-aperture images and the integral can be interpreted as adding transformed sub-aperture images.

At step 612, the shifted sub-aperture images (step 610) are combined to form refocused (rendered) image 130 (FIG. 1), via rendering module 106. Steps 610 and 612 may be performed via a shift-and-add algorithm. For example, a specific shift amount (corresponding to α in Equation (4)) may be selected. Next, each sub-aperture image may be horizontally shifted according to its position. Next, all resulting shifted images may be blended together with normalized coefficients (as shown in Equation (4)). The results correspond to a pseudo 2D refocused image.

It is contemplated that a non-transitory computer readable medium may store computer readable instructions for machine execution of the steps 602 and 606-612.

Referring to FIG. 6B, an example method for rendering an image from raw 3D LF image 128 (FIG. 1) is shown. Some of the steps illustrated in FIG. 6B may be performed by rendering module 106 (FIG. 1) from 3D LF image 128 captured by 3D LF camera 102. The steps illustrated in FIG. 6B represent an example embodiment of the present invention. It is understood that certain steps may be performed in an order different from what is shown. Although FIG. 6B illustrates rendering a single image, the method shown in FIG. 6B may also be applied to a plurality of captured 3D LF images of the scene.

At step 620, steps 604-606 are repeated, to form a set of sub-aperture images. At step 622, a viewpoint for the image is selected, for example, via user interface 112 (FIG. 1).

At step 624, instead of using a uniform weight, a different weight may be assigned to different sub-aperture images. For example, higher weight(s) may be assigned to sub-aperture image(s) closer to the selected (synthetic) viewpoint, for example, via rendering module 106. At step 626, lower weight(s) may be assigned to other sub-aperture images in the set of sub-aperture images that are farther away from the selected viewpoint, for example, via rendering module 106. At step 628, rendering module 106 may apply a shift-and-add algorithm to the weighted sub-aperture images (steps 624-626) to form perspective (rendered) image 130 (FIG. 1). The same shift-and-add algorithm described above in steps 610 and 612 (FIG. 6A) may be applied to generate a synthetically defocused image in step 628, except that, in step 628, a different weight scheme is used when adding (i.e., combining) all of the views.

At optional step 630, rendering module 106 may generate a stereoscopic view image from the perspective image (step 628) (or from raw 3D LF image 128 or the refocused image in step 612 of FIG. 6A, for example, via a red-cyan anaglyph. The stereoscopic (rendered) image may include two images superimposed with different colors (such as red and cyan or other chromatically opposite colors), producing a stereo effect when the image is viewed through correspondingly colored filters. In general, anaglyph images contain two differently filtered colored images, one for each eye. When viewed through color-coded anaglyph glasses, each of the two images reaches the respective eye, revealing an integrated stereoscopic image. The visual cortex of the brain fuses this image into perception of a three-dimensional scene or composition.

It is contemplated that a non-transitory computer readable medium may store computer readable instructions for machine execution of the steps 624-630.

Referring to FIG. 6C, an example method for forming a 3D photograph 116 (FIGS. 1 and 3) is shown. At step 640, a raw 3D LF image of a scene is captured, for example, via 3D LF camera 102. At step 642, the captured (raw) 3D LF image is printed, for example, by printer 114, forming printed image 122. At step 644, printed image 122 is disposed on cylindrical lens array 124 to form 3D photograph 116. In some examples, printed image 122 may be permanently disposed on cylindrical lens array 124, for example, such as via an adhesive. In some examples, printed image 122 may be detachably disposed on cylindrical lens array 124. For example, printed image 122 and lens array 124 may be disposed in a housing (such as a frame) configured to (detachably) fix printed image 122 to lens array 124. Additional processes such as image super-resolution and/or denoising can be applied to the raw 3D LF image prior to forming the 3D photograph (such as via rendering module 106 shown in FIG. 1), to improve the quality of the final result.

Example 3D LF camera 102 (FIG. 1) may be configured to record a 3D light field 128 of a scene. Specifically, 3D LF camera 102 preserves a high spatial resolution along the cylindrical lens direction while obtaining angular information in the other direction. With the captured light field, system 100 is able to recover and render a 3D representation of the scene that can be visualized with or without 3D glasses. Because 3D LF camera 102 uses a general purpose camera 120, it can be applied to a variety of applications. A conventional 2D image has a fixed viewpoint and lacks depth perception. In contrast, system 100 enables a solid stereoscopic view of an object to be perceived at different viewpoints.

Figure 9A:
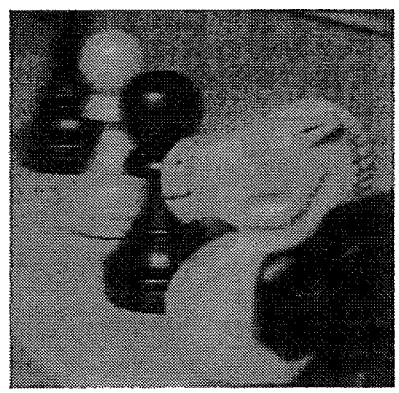
FIGS. 9A and 9B are example rendered 3D images illustrating stereoscopic views of the images shown in respective FIGS. 8B and 8D with different perspective, according to an aspect of the present invention.
Figure 9B:

Referring next to FIGS. 5A, 5B, 8A-8D, 9A and 9B, example data captured on real scenes using example 3D LF camera 102 (FIG. 1) and rendering using system 100 are described. In particular, FIGS. 5A and 5B are example raw 3D light field images captured for two different scenes; FIGS. 8A-8D are example rendered refocused 3D images of the raw images shown in respective FIGS. 5A and 5B for different focus depths; and FIGS. 9A and 9B are example rendered 3D images illustrating stereoscopic views of the images shown in respective FIGS. 8B and 8D with a different perspective.

In the example, an XSi DSLR camera (e.g., camera 120) manufactured by Canon Inc. (Tokyo, Japan) with a sensor resolution of 5,184×3,456 is used to capture the data. The width of slit 206 (FIG. 2B) of aperture mask 204 (at the aperture) measures 1.3 mm. Cylindrical lens array 210 includes 40 cylindrical lenses 212. A pitch of each lens 212 in array 210 is 0.25 mm, and the focal length is 1.6 mm. A size of the cylindrical lens array 210 is 10 mm×10 mm, which amounts to an effective resolution of 2000×2000.

To generate the refocused image, shown in FIGS. 8A-8D, the sub-aperture image is first generated by taking the same stripe of pixels underneath each cylindrical lens. Then a refocus plane is selected and the shift-and-add refocus algorithm is used in the light field image to render the refocus images. (See FIG. 6A.)

FIGS. 9A and 9B shows that system 100 is able to render objects from different perspectives. FIGS. 9A and 9B also demonstrate rendered images in a stereoscopic view (e.g., by using a red-cyan anaglyph). To render different perspectives, a higher weight may be assigned to the sub-aperture image with a desired viewpoint and a lower weight may be assigned to other sub-aperture images. A shift-and-add algorithm may then be applied to render the images. (See FIG. 6B.)

Although the invention has been described in terms of methods and systems for capturing, processing and presenting 3D images, it is contemplated that one or more steps and/or components may be implemented in software for use with microprocessors/general purpose computers (not shown). In this embodiment, one or more of the functions of the various components and/or steps described above may be implemented in software that controls a computer. The software may be embodied in non-transitory tangible computer readable media (such as, by way of non-limiting example, a magnetic disk, optical disk, hard drive, etc.) for execution by the computer. As described herein, devices 104, 106, 110, 112 and 114, shown in FIG. 1, may perform certain operations using dedicated circuitry and/or using software contained in a computer-readable medium 108 coupled to controller 104. The software instructions may cause controller 104 and/or rendering module 106 to perform one or more processes described herein. Alternatively, hardwired circuitry may be used in place of, or in combination with, software instructions to implement processes described herein. Thus, implementations described herein are not limited to any specific combination of hardware circuitry and software.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of generating an image of a scene, the method comprising:
    directing light representing the scene through a lens module coupled to an imaging sensor, the lens module including: a surface having a slit-shaped aperture and a cylindrical lens array positioned along an optical axis of the imaging sensor, a longitudinal direction of the slit-shaped aperture being arranged orthogonal to a cylindrical axis of the cylindrical lens array;
    capturing, by the imaging sensor, the light directed through the lens module to form a three-dimensional (3D) light field (LF) image; and
    processing, by a processor, the 3D LF image to form a rendered image based on pitch size, focal length and an image center of each lens in the cylindrical lens array, wherein the processing includes at least one of: (a) refocusing the 3D LF image to a predetermined focus depth, including prior to refocusing the 3D LF image, locating the image center of each lens in the cylindrical lens array, based on a reference image, (b) adjusting a perspective of the 3D LF image based on a predetermined viewpoint, or (c) generating a 3D stereoscopic view image from the 3D LF image.

2. The method according to claim 1, wherein the directing of the light includes directing the light through the slit-shaped aperture onto a lens of the lens module to form aperture-shaped light and passing the aperture-shaped light from the lens through the cylindrical lens array onto the imaging sensor.

3. The method according to claim 1, wherein the reference image is a 3D LF image captured of a reference scene.

4. The method according to claim 1, the method further including displaying at least one of the 3D LF image or the rendered image.

5. A method of generating an image of a scene, the method comprising:
    directing light representing the scene through a lens module coupled to an imaging sensor, the lens module including: a surface having a slit-shaped aperture and a cylindrical lens array positioned along an optical axis of the imaging sensor, a longitudinal direction of the slit-shaped aperture being arranged orthogonal to a cylindrical axis of the cylindrical lens array; and
    capturing, by the imaging sensor, the light directed through the lens module to form a three dimensional (3D) light field (LF) image;
    processing, by a processor, the 3D LF image to form a rendered image, wherein the processing includes at least one of refocusing the 3D LF image to a predetermined focus depth, adjusting a perspective of the 3D LF image based on a predetermined viewpoint or generating a 3D stereoscopic view image from the 3D LF image; and
    printing at least one of the 3D LF image or the rendered image to form a printed image.

6. The method according to claim 5, the method further including disposing the printed image on a further cylindrical lens array to form a 3D photograph.

7. The method according to claim 1, further comprising repeating the directing of the light and the capturing of the directed light to capture a plurality of 3D LF images of the scene.

8. A system for generating an image of a scene, comprising:
    a three-dimensional (3D) light field (LF) camera comprising:

a surface having a slit-shaped aperture mounted on a lens;

an imaging sensor configured to capture at least one 3D LF image of a scene; and a cylindrical lens array disposed between the imaging sensor and the lens, along an optical axis of the imaging sensor, a longitudinal direction of the slit-shaped aperture being arranged orthogonal to a cylindrical axis of the cylindrical lens array; and a processor configured for:

processing the 3D LF image to form a rendered image based on pitch size, focal length and an image center of each lens in the cylindrical lens array, wherein the processing includes at least one of: (a) refocusing the 3D LF image to a predetermined focus depth, including prior to refocusing the 3D LF image, locating the image center of each lens in the cylindrical lens array, based on a reference image, (b) adjusting a perspective of the 3D LF image based on a predetermined viewpoint, or (c) generating a 3D stereoscopic view image from the 3D LF image.

9. The 3D LF camera according to claim 8, wherein:

the surface, the lens and the cylindrical lens array are disposed in a lens module, and the lens module is coupled to a camera including the imaging sensor.

10. The 3D LF camera according to claim 9, wherein the lens module is configured to be detachably coupled to the camera.

11. The 3D LF camera according to claim 9, wherein the camera includes a digital single-lens reflex (DSLR) camera.

12. The 3D LF camera according to claim 8, wherein the cylindrical lens array includes a plurality of cylindrical lens arranged to extend in a vertical direction.

13. The 3D LF camera according to claim 8, wherein the at least one 3D LF image includes a plurality of 3D LF images of the scene.

14. The 3D LF camera according to claim 8, wherein the cylindrical lens array is configured to provide higher resolution in a first direction corresponding to the cylindrical axis and higher angular information in a second direction opposite the first direction.

15. The 3D LF camera according to claim 8, wherein the slit-shaped aperture is configured to reduce defocus blurring.

16. A three-dimensional (3D) photograph comprising:

a 3D light field printed image of a scene; and a first cylindrical lens array disposed on the 3D light field printed image, such that the combination of the 3D light field printed image and the first cylindrical lens array forms a 3D stereoscopic image;

wherein the 3D light field printed image comprises an image rendered by:

directing light representing the scene through a lens module coupled to an imaging sensor, the lens module including: a surface having a slit-shaped aperture and a second cylindrical lens array positioned along an optical axis of the imaging sensor, a longitudinal direction of the slit-shaped aperture arranged orthogonal to a cylindrical axis of the second cylindrical lens array;

capturing, by the imaging sensor, the light directed through the lens module to form a three-dimensional (3D) light field (LF) image;

processing, by a processor, the 3D LF image by at least one of refocusing the 3D LF image to a predetermined focus depth, adjusting a perspective of the 3D LF image based on a predetermined viewpoint or generating a 3D stereoscopic view image from the 3D LF image.

17. The 3D photograph according to claim 16, wherein the 3D photograph is an autostereoscopic 3D display.

18. The 3D photograph according to claim 16, wherein the 3D light field printed image is captured via a camera comprising the imaging sensor and the lens module, and wherein the 3D light field printed image includes a set of sub-aperture images corresponding to the second cylindrical lens array.

19. The 3D photograph according to claim 18, wherein the 3D light field printed image is disposed on the first cylindrical lens array such that the set of sub-aperture images are arranged parallel to a cylindrical axis of the first cylindrical lens array.

* * * * *